(12) United States Patent
Needham

(10) Patent No.: US 6,910,147 B2
(45) Date of Patent: Jun. 21, 2005

(54) DIGITAL RECORDING APPARATUS REAL-TIME CLOCK

(75) Inventor: Bradford H Needham, North Plains, OR (US)

(73) Assignee: Intel Corporation, Santa Clara, CA (US)

( * ) Notice: Subject to any disclaimer, the term of this patent is extended or adjusted under 35 U.S.C. 154(b) by 636 days.

(21) Appl. No.: 10/001,724

(22) Filed: Oct. 31, 2001

(65) Prior Publication Data

US 2003/0084366 A1 May 1, 2003

(51) Int. Cl.$^7$ ................................................. G06F 1/14
(52) U.S. Cl. ..................... 713/502; 713/600; 348/207.1; 399/37; 399/59
(58) Field of Search ................................. 713/500, 502, 713/600; 348/207.99, 207.1, 207.11; 399/37, 59

(56) References Cited

U.S. PATENT DOCUMENTS

| | | | |
|---|---|---|---|
| 5,583,833 A | * | 12/1996 | Capps et al. ................ 368/185 |
| 5,657,077 A | * | 8/1997 | DeAngelis et al. .......... 348/157 |
| 5,815,733 A | * | 9/1998 | Anderson et al. ............ 710/48 |
| 6,134,606 A | * | 10/2000 | Anderson et al. ............ 710/14 |
| 6,226,449 B1 | * | 5/2001 | Inoue et al. ................ 386/120 |
| 6,542,183 B1 | * | 4/2003 | DeAngelis et al. .......... 348/157 |
| 6,715,003 B1 | * | 3/2004 | Safai ........................... 710/33 |
| 6,724,974 B2 | * | 4/2004 | Naruto et al. ................ 386/46 |

FOREIGN PATENT DOCUMENTS

EP          0565180 A2  * 10/1993          H04Q/7/02

* cited by examiner

*Primary Examiner*—Rehana Perveen
(74) *Attorney, Agent, or Firm*—Kacvinsky LLC

(57) ABSTRACT

An embodiment of a digital recording apparatus real-time clock is disclosed. In particular, a real-time clock to mark when each recording is taken is described. The embodiment comprises a digital recording apparatus that contains a real-time clock powered by the main battery of the digital recording apparatus. The real-time clock resets when the digital recording apparatus's batteries are removed. When a recording is made, the digital recording apparatus marks the recording with the current value of the real-time clock, e.g., seconds since the batteries were changed. A computer then reads the media recorded by the digital recording apparatus and provides a date and time reference to which to relate the digital recording apparatus's real-time clock.

30 Claims, 5 Drawing Sheets

DIGITAL RECORDING APPARATUS REAL-TIME CLOCK

BACKGROUND

1. Field of the Invention

Embodiments described herein are directed to a digital recording apparatus real-time clock. In particular, a real-time clock to denote the time and date when a recording is taken is described.

2. Related Art

Existing cameras that denote the date and time of recordings typically use a battery backed-up clock. Real-time clock chips that require a backup battery are frequently implemented as well. In addition, synchronizing a free-running clock with a reference clock is another common way of indicating the date and time of recordings. Basically, existing methods of logging the date and time of recordings rely on a clock that operates continuously, even while the batteries are being changed.

Current inexpensive digital cameras such as, for example, the Intel Pocket PC camera, lack a feature necessary for picture organization, namely a real-time clock to denote when each recording was taken. Such a feature has been omitted in digital cameras because of the cost involved in adding a physical user interface to set the camera's date and time. The cost of a backup battery that prevents the camera clock from resetting during replacement of the camera's main batteries is another reason for such an omission. A method of simply implementing a real-time clock operated by the camera's batteries may fail to date correctly all of the recordings taken before and after the batteries are changed. As such, a real-time clock mechanism for marking when recordings are taken that does not require a user interface or a backup battery would prove beneficial.

BRIEF DESCRIPTION OF THE DRAWINGS

A detailed description of embodiments of the invention will be made with reference to the accompanying drawings, wherein like numerals designate corresponding parts in the several figures.

DETAILED DESCRIPTION

Figure 1:
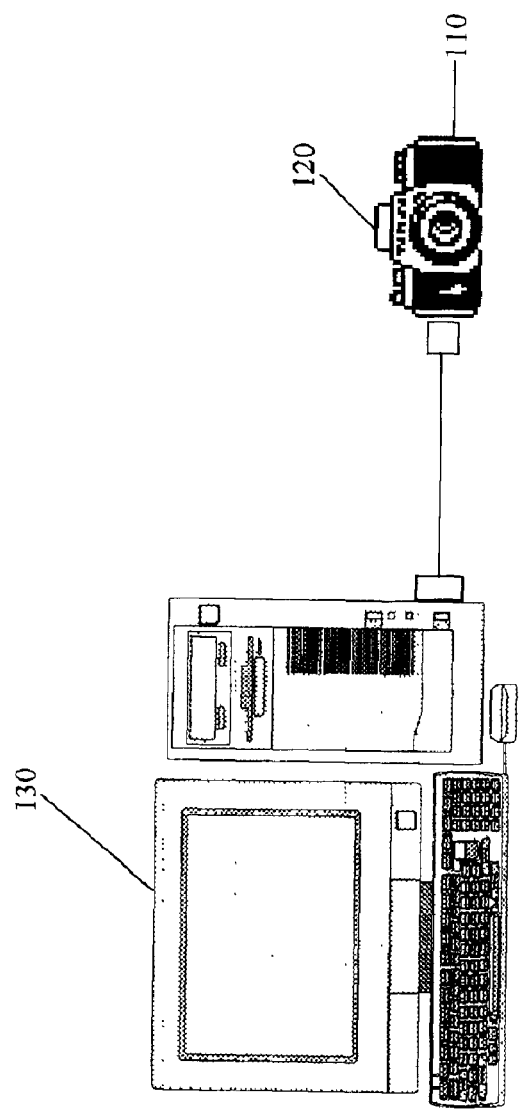
FIG. 1 is a depiction of a digital recording apparatus real-time clock and a computer that reads the media recorded by the digital recording apparatus and provides a date and time reference.

The following paragraphs describe an embodiment of a digital recording apparatus real-time clock. As shown in FIG. 1, the embodiment comprises a digital recording apparatus 110 such as a digital camera or a digital video recorder that contains a real-time clock 120 powered by the main battery of the digital recording apparatus 110. The clock 120 resets when the digital recording apparatus's 110 batteries are removed. When a recording is made, the digital recording apparatus 110 marks the recording with the current value of the real-time clock 120, e.g., seconds since the batteries were changed.

A computer 130 such as a personal computer (desktop or notebook), personal digital assistant, gaming device, or any other device capable of running the relevant software program that reads the media recorded by the digital recording apparatus 110 is then implemented to provide a date/time reference to which to relate the digital recording apparatus's real-time clock 120. Whenever the digital recording apparatus 110 docks to the computer 130, the computer 130 records the clock's 120 reading and the computer's 130 date and time. Using these two pieces of information, the computer 130 can calculate, for those recordings (i.e., still photographs as taken by a still digital camera or video clips as taken by a digital video camera) taken since the digital recording apparatus's 110 batteries were changed, the date and time that each recording was taken. A real-time clock 120 may be especially useful in low-end, non-tethered still and video cameras to provide the date and time that a recording was taken.

Figure 2:
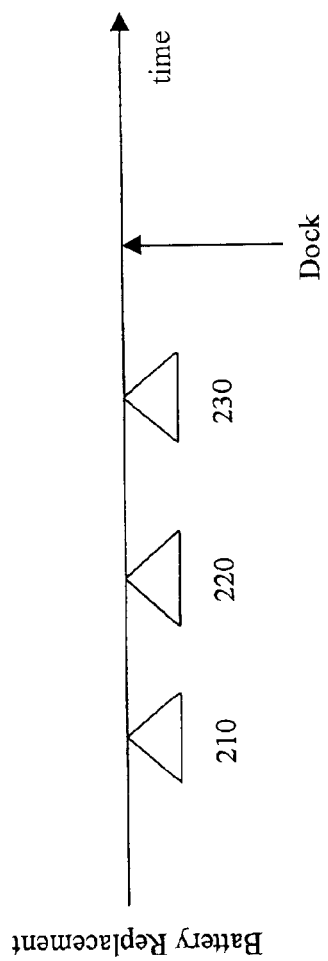
FIG. 2 is a graph that depicts the use of the real-time clock to date recordings since the clock has been reset, according to an embodiment of the present invention.

According to one embodiment of the present invention, FIG. 2 depicts a digital recording apparatus 110 that has taken three recordings, namely 210, 220, and 230, since its batteries were changed. At docking time, the computer 130 reads the current real-time clock 120 value of 129,685 seconds since reset and records that value as being equal to the computer's 130 current date and time of Oct. 10, 2001 at 9:05:17 am. Now suppose recording 230 has a recorded clock value of 122,434. The computer 130 can fix that recording's date and time as 7,251 seconds before 9:05:17 am; that is, 7:04:26 am. The computer 130 can similarly find the date and time that recordings 210 and 220 were taken.

Figure 3:
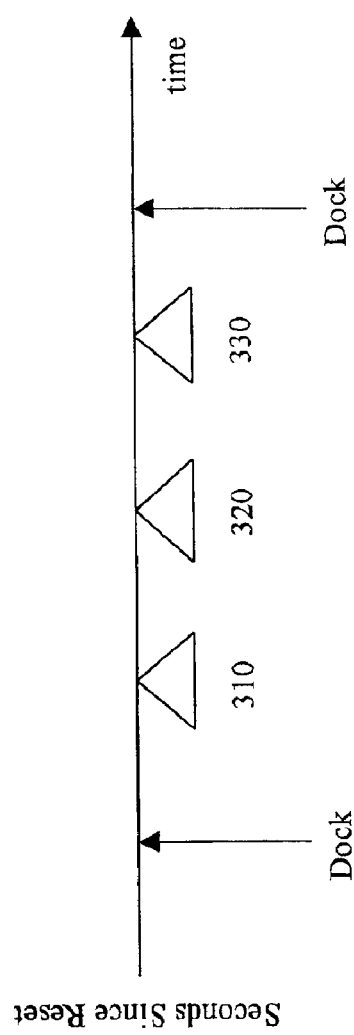
FIG. 3 is a graph that illustrates the use of the real-time clock to date recordings since docking time, according to an embodiment of the present invention.

Another scenario for consideration is the situation whereby the digital recording apparatus 110 is undocked and records several additional recordings. FIG. 3 illustrates how the computer 130 can, at a later date, calculate the dates and times of each such recording by examining the difference between the real-time clock 120 at the time a recording was taken and the real-time clock 120 at the time of last docking. For example, a recording 310 may have a recorded clock value of 162,085, indicating that it was taken 32,400 seconds after docking, namely at 6:05:17 pm on Oct. 10, 2001.

An additional scenario for consideration is that whereby the digital recording apparatus 110 was docked, recordings were then taken, the battery was then replaced, and additional recordings were subsequently taken. Depending on the duration of time in which the digital recording apparatus 110 remained idle between recordings, the computer 130 may not be able to detect which recordings were taken before the battery was replaced from those that were taken after the battery replacement.

One refinement corrects the above-described problem. By making the real-time clock's 120 range at least twice the maximum anticipated battery life of the digital recording apparatus 110, and upon docking, advancing the real-time clock 120 past the midpoint, the computer 130 can always determine whether a recording was taken before or after battery replacement. That is, those recordings taken between docking and battery replacement will have real-time clock 120 values that are greater than one-half the range of the real-time clock 120. Meanwhile, recordings taken between battery replacement and a succeeding docking will have values that are less than one-half of the real-time clock's 120 range.

Figure 4:
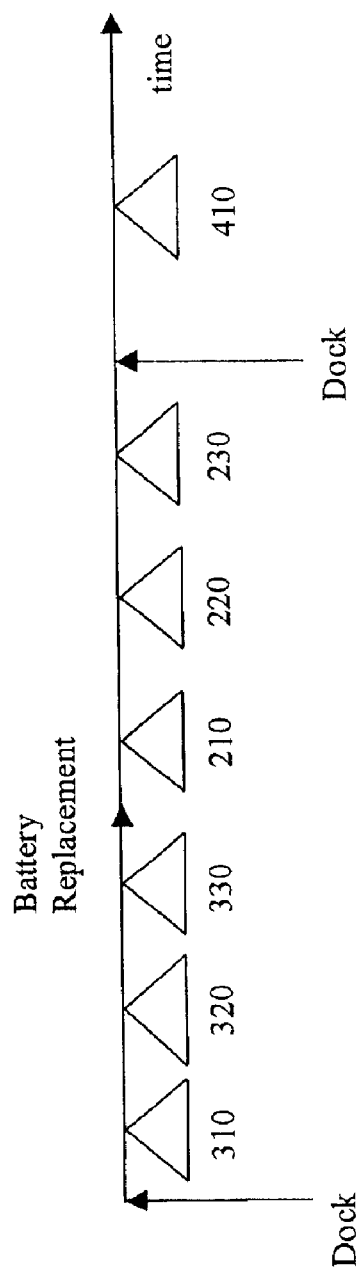
FIG. 4 is a graph that distinguishes between recordings taken before and after a change of batteries in the real-time clock, according to an embodiment of the present invention.

FIG. 4 illustrates such a refinement. At docking, the real-time clock 120 is set to 3,000,000, and correlates to Oct. 6, 2001, at 4:31:45 pm. Recordings 310, 320, 330, and 410 will have times greater than 3,000,000 seconds, indicating that they should be correlated to the real-time clock 120 value at last docking. In contrast, recordings 210, 220, and 230 will have times less than 3,000,000 seconds, indicating that they should be correlated to the time of the current docking. The digital recording apparatus real-time clock thus has the ability to calculate unambiguously the date and time for each recording, despite that the real-time clock 120 was reset when the user changed the digital recording apparatus's 110 battery.

Figure 5:
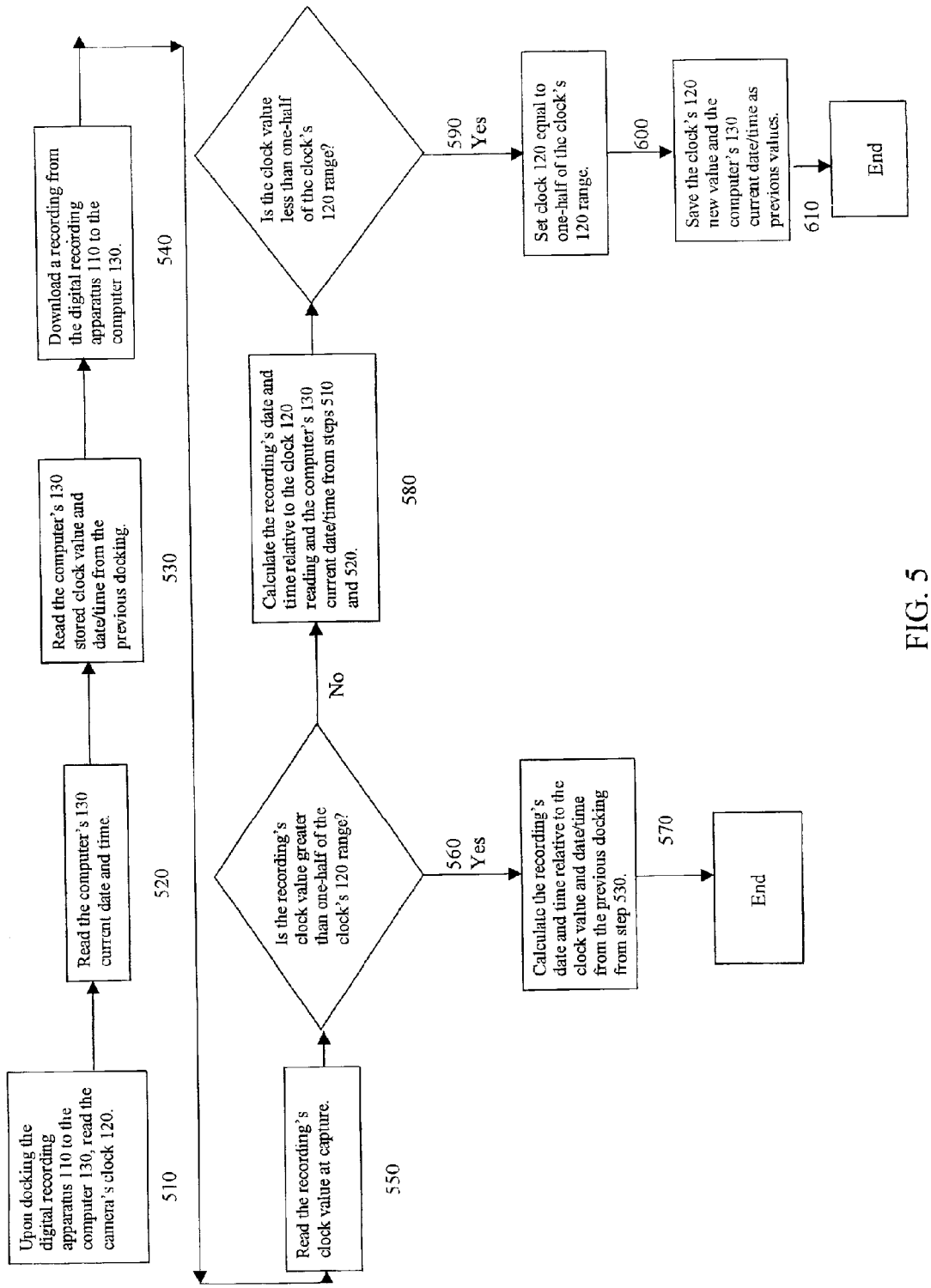
FIG. 5 is a flowchart that shows the steps involved in denoting the date and time in which recordings are taken.

FIG. 5 is a flowchart that shows the steps involved in dating recordings. Step 510 shows that on docking the digital recording apparatus 110 to the computer 130, the real-time clock 120 is read. Next, the computer's 130 current date and time are read, as illustrated by step 520. Step 530 depicts the reading of the computer's 130 stored clock value and date and time from the previous docking. As illustrated in step 540, recordings from the digital recording apparatus 110 are then downloaded to the computer 130. The recording's clock value at capture is then read. As shown in step 560, it must then be determined whether this value is greater than one-half of the real-time clock 120 range. If so, then the recording's date and time relative to the clock value and date and time from the previous docking (from step 530) is calculated. This action is shown as step 570. Else, the recording's date and time relative to the real-time clock 120 value and the computer's 130 current date and time (from steps 510 and 520) is calculated, as illustrated by step 580. As depicted in step 590, it is next determined whether the real-time clock 120 value is less than one-half of the clock's 120 range. If yes, the real-time clock 120 is then set to one-half of the real-time clock's 120 range, depicted as step 600. As shown in step 610, the real-time clock's 120 new value and the computer's 130 current date and time are then saved as previous docking values.

While the above description refers to particular embodiments of the present invention, it will be understood to those of ordinary skill in the art that modifications may be made without departing from the spirit thereof The accompanying claims are intended to cover any such modifications as would fall within the true scope and spirit of the present invention.

The presently disclosed embodiments are therefore to be considered in all respects as illustrative and not restrictive; the scope of the invention being indicated by the appended claims, rather than the foregoing description. All changes that come within the meaning and range of equivalency of the claims are therefore intended to be embraced therein.

What is claimed is:

1. An apparatus to denote the date and time in which recordings are taken comprising:
   a digital recording apparatus having a real-time clock that is powered by a main battery of the digital recording apparatus, wherein the real-time clock resets when the battery is removed; and
   a computer that reads media recorded by the digital recording apparatus and provides a date and time at which the media was recorded based on the digital recording apparatus's real-time clock.

2. The apparatus of claim 1, wherein the digital recording apparatus may be one of a digital camera and a digital video recorder.

3. The apparatus of claim 2, wherein the digital recording apparatus marks a recording with a current value of the real-time clock.

4. The apparatus of claim 3, wherein the current value of the real-time clock is seconds since battery replacement.

5. The apparatus of claim 1, wherein the computer records the real-time clock's reading and the computer's current date and time when the digital recording apparatus docks to the computer.

6. The apparatus of claim 5, wherein the computer calculates, for those recordings taken since battery replacement, the date and time that a recording was taken.

7. The apparatus of claim 1, wherein the computer calculates the date and time that a recording was taken, when the digital recording apparatus is undocked, by examining the difference between the digital recording apparatus's real-time clock at the time a recording was taken and the real-time clock at the time of last docking.

8. The apparatus of claim 1, wherein the real-time clock has a range that is at least twice the maximum anticipated battery life of the digital recording apparatus.

9. The apparatus of claim 8, wherein upon docking, the real-time clock is advanced to past the midpoint of the real-time clock's range to aid the computer in determining whether a recording was taken before or after battery replacement.

10. The apparatus of claim 1, wherein algorithms are used for performing date and time calculations.

11. The apparatus of claim 1, wherein the real-time clock is capable of operating without an additional physical user interface.

12. The apparatus of claim 1, wherein the real-time clock is capable of operating without a backup battery.

13. A digital recording apparatus real-time clock system comprising a readable medium and a computer readable program code stored on the computer readable medium having instructions to:
   read a digital recording apparatus's real-time clock and read a computer's current date and time;
   read the computer's stored clock value and date and time from a previous docking;
   download a recording from the digital recording apparatus to the computer and read its clock value;
   determine if the recording's clock value is greater than one-half of the clock's range;
   calculate the recording's date and time relative to the computer's stored clock reading and date and time reading from the previous docking, if the recording's clock value is greater than one-half of the real-time clock's range;
   otherwise, calculate the recording's date and time relative to the real-time clock's reading and the computer's current date and time reading;
   set the real-time clock equal to one-half of the real-time clock's range if the real-time clock reading is less than one-half of the real-time clock's range;
   save the real-time clock's new value and the computer's current date and time as previous docking values.

14. The system of claim 13, wherein instructions are provided to the digital recording apparatus to mark a recording with a current value of the real-time clock.

15. The system of claim 13, wherein instructions are provided to the computer to record the real-time clock's reading and the computer's current date and time when the digital recording apparatus docks to the computer.

16. The system of claim 13, wherein instructions are provided to the computer to calculate the date and time that a recording was taken, when the digital recording apparatus is undocked, by examining the difference between the digital recording apparatus's real-time clock at the time a recording was taken and the real-time clock at the time of last docking.

17. The system of claim 13, wherein the real-time clock has a range that is at least twice the maximum anticipated battery life of the digital recording apparatus.

18. The system of claim 13, wherein the digital recording apparatus may be one of a digital camera and a digital video recorder.

19. The system of claim 13, wherein the real-time clock is powered by a main battery of the digital recording apparatus.

20. The system of claim 19, wherein the real-time clock resets automatically when the battery of the digital recording apparatus is removed.

21. The system of claim 19, wherein the real-time clock does not require a physical user interface or a backup battery for operation.

22. A method of denoting the date and time in which recordings are taken comprising:

reading a digital recording apparatus's real-time clock and reading a computer's current date and time;

reading the computer's stored clock value and date and time from a previous docking;

downloading a recording from the digital recording apparatus to the computer and reading its clock value;

determining if the recording's clock value is greater than one-half of the clock's range;

calculating the recording's date and time relative to the computer's stored clock reading and date and time reading from the previous docking, if the recording's clock value is greater than one-half of the real-time clock's range;

otherwise, calculating the recording's date and time relative to the real-time clock's reading and the computer's current date and time reading;

setting the real-time clock equal to one-half of the real-time clock's range if the real-time clock reading is less than one-half of the real-time clock's range;

saving the real-time clock's new value and the computer's current date and time as previous docking values.

23. The method of claim 22, wherein the digital recording apparatus may be one of a digital camera and a digital video recorder.

24. The method of claim 22, wherein the real-time clock is powered by a main battery of the digital recording apparatus.

25. The method of claim 24, wherein the real-time clock resets when the digital recording apparatus battery is removed.

26. The method of claim 24, wherein the real-time clock is capable of operating without a physical user interface or a backup battery.

27. The method of claim 22, wherein the digital recording apparatus marks a recording with a current value of the real-time clock.

28. The method of claim 22, wherein the computer records the real-time clock's reading and the computer's current date and time when the digital recording apparatus docks to the computer.

29. The method of claim 22, wherein the computer calculates the date and time that a recording was taken, when the digital recording apparatus is undocked, by examining the difference between the digital recording apparatus's real-time clock at the time a recording was taken and the real-time clock at the time of last docking.

30. The method of claim 22, wherein the real-time clock's range is at least twice the maximum anticipated battery life of the digital recording apparatus.

\* \* \* \* \*